United States Patent [19]

Isoda

[11] Patent Number: 4,984,460
[45] Date of Patent: Jan. 15, 1991

[54] MASS FLOWMETER

[75] Inventor: Yoritaka Isoda, Amagasaki, Japan

[73] Assignee: Lintec Co., Ltd., Shiga, Japan

[21] Appl. No.: 280,863

[22] Filed: Dec. 7, 1988

[30] Foreign Application Priority Data

Dec. 8, 1987 [JP] Japan .................................. 62-310540

[51] Int. Cl.$^5$ .............................................. G01F 1/68
[52] U.S. Cl. .............................. 73/204.15; 73/204.25; 374/54
[58] Field of Search ........... 73/204.15, 204.19, 204.25, 73/204.27; 374/54

[56] References Cited

U.S. PATENT DOCUMENTS

| 2,552,017 | 5/1951 | Schwartz et al. | 73/204.15 |
|---|---|---|---|
| 3,020,760 | 2/1962 | Schnoll | 73/204.25 |
| 3,438,254 | 4/1969 | Seeley | 73/204.25 |
| 3,968,685 | 7/1976 | MacHattie | 73/204.19 |
| 4,135,396 | 1/1979 | Stanke et al. | 73/204.19 |
| 4,297,881 | 11/1981 | Sasayama et al. | 73/204.15 |
| 4,464,932 | 8/1984 | Ewing et al. | 73/204.15 |
| 4,487,063 | 12/1984 | Hopper | 73/204.19 |
| 4,519,246 | 5/1985 | Hartemink | 73/204.27 |
| 4,581,929 | 4/1986 | Sugiura | 73/204.19 |
| 4,672,847 | 6/1987 | Uchiyawa et al. | 73/204.19 |

FOREIGN PATENT DOCUMENTS

| 58-45568 | 3/1983 | Japan | 73/204.15 |
|---|---|---|---|
| 60-187816 | 9/1985 | Japan | 73/204.15 |
| 61-128123 | 1/1986 | Japan | 73/204.15 |
| 62-812 | 1/1987 | Japan | 73/204.15 |
| 389405 | 7/1973 | U.S.S.R. | 73/204.25 |
| 673143 | 6/1952 | United Kingdom | 73/204.25 |

Primary Examiner—William A. Cuchlinski, Jr.
Assistant Examiner—Diego F. F. Gutierrez
Attorney, Agent, or Firm—Edwin E. Greigg

[57] ABSTRACT

A mass flowmeter comprising heat sensitive coils mounted at an upstream position and a downstream position of a conduit through which a fluid flows. The heat sensitive coils have a resistance variable with the fluid temperature, and are each included in a constant temperature difference circuit. This circuit further includes an ambient temperature detecting resistor having approximately the same characteristics as the heat sensitive coils, and a temperature difference setting resistor having approximately zero temperature coefficient. These resistors are connected in series to the heat sensitive coil. The circuits are connected to a control unit which controls differences between temperatures of the heat sensitive coils and ambient temperature to be approximately the same as a value set by the temperature difference setting resistor. A mass flow rate of the fluid through the conduit being measured by detecting a difference in amounts of energy supplied to the heat sensitive coils.

3 Claims, 4 Drawing Sheets

MASS FLOWMETER

BACKGROUND OF THE INVENTION (1) Field of the Invention

The present invention relates to mass flowmeters for precisely measuring the mass flow rate of a fluid flowing through a conduit.

(2) Description of the Prior Art

An example of such mass flowmeters is disclosed in Japanese Patent Publication No. 56-23094, which comprises heat sensitive coils having a large temperature coefficient and mounted at an upstream position and a downstream position of a conduit. The flow rate is measured by supplying constant current to the heat sensitive coils and detecting temperature distributions at heat sensitive parts which are variable with fluid flows. Another example is disclosed in Japanese Patent Publication Kokai No. 59-18423, in which a passing fluid is conditioned such as by adjusting fluid temperatures. The temperature of the fluid varies as a result of a heat exchange taking place when the fluid passes through the flowmeter. The flow rate is measured by displaying an amount of energy consumed at either the temperature adjusting stage or the temperature varying stage.

The former lacks in responsivity since the measurement is influenced by the speed of variations in the temperature distribution and by the heat capacity of the conduit and its coating. The latter, though higher in response speed than the former, has the zero point readily variable with variations in the ambient temperature and in the heat capacity of the fluid since its operating principle is the same as that of a hot-wire current meter. A temperature adjusting circuit may be provided to eliminate this disadvantage, but the effect thereby produced is not significant for the complicated circuit construction.

As a further example, there is a mass flowmeter, as shown in FIG. 3, which includes a compensation circuit 65 expressed in the following formula:

$$\frac{Vu \text{ (upstream coil voltage)} - Vd \text{ (downstream coil voltage)}}{Vu \text{ (upstream coil voltage)} + Vd \text{ (downstream coil voltage)}}$$

(1) However, perfect temperature compensation is impossible since (Vu+Vd), strictly speaking, not only varies with temperature variations but also with flow rate variations.

(2) Temperature setting resistors 61 and 61' must be resistors with temperature coefficients close to zero. The heat sensitive coils Ru and Rd, therefore, are set to a fixed temperature (of 80°-90° C., for example). As a result, great signal noise occurs when the ambient temperature exceeds the temperature of the coils Ru and Rd or when there is little difference therebetween, which renders the flowmeter unusable.

(3) Similarly, since the heat temperature of the coils Ru and Rd must be set considerably higher than the ambient temperature, the flowmeter is not applicable to measurement of a highly reactive fluid G.

Meanwhile, a proposal has been made, as shown in FIG. 4, to provide constant temperature difference circuits Tu and Td including, connected in series to the heat sensitive coils Ru and Rd, temperature detecting resistors 11 and 11' having approximately the same temperature coefficients as the coils Ru and Rd, respectively.

According to this system, the upstream and downstream coils Ru and Rd have a temperature characteristic expressed in the following equation:

$$Ru = Rd = Ro(1 + \alpha t) \quad (1)$$

where Ru and Rd are the resistances of coils Ru and Rd respectively, Ro is the resistance of the two coils Ru and Rd at 0° C., t is a temperature of the coils Ru and Rd, and α is the temperature coefficient of the coils Ru and Rd.

The constant temperature difference circuits Tu and Td are designed to operate so as to establish the following equation (2):

$$Ru(Rd) = (11) = (11') = ARo(1 + \alpha T) \quad (2)$$

where T is the ambient temperature, and A is greater than 1 (since Ru must be greater than (11) and Rd greater than (11')).

Next, when equation (1) is substituted into equation (2), then;

$$t = \{(A-1)/\alpha\} + AT \quad (3)$$

Thus the coil temperature t is multiplied by A in response to variations in the ambient temperature T, which does not result in a constant temperature difference. This flowmeter still is incapable of accurate mass flow rate measurement.

SUMMARY OF THE INVENTION

The present invention has been made having regard to the state of the art as noted above. The object of the invention is to provide a mass flowmeter employing the constant temperature difference mode and, therefore, having a high response speed, and which is little influenced by the ambient temperature, is applicable to a wider range of temperatures than the constant temperature type with the heat coils controlled to a fixed temperature, and imparts little influence to a material under measurement since its heat sensitive coils need not be heated to a high temperature.

In order to achieve this object a mass flowmeter according to the present invention comprises a pair of heat sensitive coils mounted at an upstream position and a downstream position of a conduit through which a fluid flows, the heat sensitive coils having resistance variable with temperature of the fluid, a pair of ambient temperature detecting resistors having approximately the same characteristics as and connected in series to each of the heat sensitive coils, a pair of temperature difference setting resistors having approximately zero temperature coefficients and connected in series to the ambient temperature detecting resistors, each of the heat sensitive coils, the ambient temperature detecting resistors and the temperature difference setting resistors being included in one of separate, upstream and downstream constant temperature difference circuits, and control means for controlling differences between temperatures of the heat sensitive coils and ambient temperature received from the constant temperature difference circuits to be approximately the same as a value set by the temperature difference setting resistor, a mass flow rate of the fluid through the conduit being measured by detecting a difference in amounts of energy supplied to the heat sensitive coils.

In the above construction, when the fluid does not flow through the conduit, approximately the same amount of energy is required for maintaining the heat sensitive coils at the same temperature difference with respect to the ambient temperature. Therefore, influences of zero point due to variations in the ambient temperature and in the fluid inside the conduit are counterbalanced. When the fluid is flowing through the conduit, the upstream heat sensitive coil loses heat to the fluid. The fluid becomes heated as a result, and the upstream coil requires a greater amount of energy to maintain the temperature difference with respect to the ambient temperature to a predetermined level than when the fluid is not flowing. On the other hand, the downstream coil receives heat from the heated fluid, and therefore requires a smaller amount of energy to maintain its temperature difference with respect to the ambient temperature than when the fluid is not flowing. The difference in the amount of energy supplied to the two coils at this time is proportional to the mass flow rate of the fluid. The mass flow rate is thus measured by detecting the difference in the amount of energy. The present invention further provides ambient temperature detecting resistors having approximately the same characteristics as the heat sensitive coils, which resistors have excellent heat conduction and sufficient heat radiation to detect the ambient temperature, and temperature difference setting resistors having a very small temperature coefficient and connected in series to the ambient temperature detecting resistors, respectively. This construction maintains the difference between the ambient temperature and the coil temperature constant at all times regardless of variations in the ambient temperature, thereby to assure accurate mass flow measurement.

Thus, according to the present invention, a mass flowmeter comprises a pair of heat sensitive coils mounted at an upstream position and a downstream position of a conduit through which a fluid flows, the heat sensitive coils having resistance variable with temperature of the fluid, an ambient temperature detecting resistor having approximately the same characteristics as and connected in series to each of the heat sensitive coils, a temperature difference setting resistor having approximately zero temperature coefficient and connected in series to the ambient temperature detecting resistor, each of the heat sensitive coils, the ambient temperature detecting resistor and the temperature difference setting resistor being included in one of separate, upstream and downstream constant temperature difference circuits, and control means for controlling differences between temperatures of the heat sensitive coils and ambient temperature received from the constant temperature difference circuits to be approximately the same as a value set by the temperature difference setting resistor, a mass flow rate of the fluid through the conduit being measured by detecting a difference in amounts of energy supplied to the heat sensitive coils. Since the temperature distribution through the upstream and downstream coils is not varied, the flowmeter has a high response speed. This flowmeter is applicable to a wider range of temperatures than the constant temperature type with the upstream and downstream heat coils controlled to a fixed temperature. The flowmeter according to the present invention has a further advantage that it imparts little influence to a material under measurement since its heat sensitive coils need not be heated to a high temperature.

In addition, since each temperature difference setting resistor having approximately zero temperature coefficient is connected in series to each heat sensitive coil, the ambient temperature in equation (14) to appear hereinafter has no coefficient as distinct from the prior art, whereby the coil temperature constantly maintains the constant ($Rsu/\alpha \cdot Ro$) with respect to the ambient temperature. Thus, the temperature difference between the ambient temperature and the temperature of heat sensitive coils is maintained constant in a reliable manner.

The mass flowmeter according to the present invention may further comprise a temperature compensation circuit for deriving the ambient temperature from an operation of a resistance which is a division of a quotient of a terminal voltage of the ambient temperature detecting resistor divided by an ampere of current flowing therethrough. Then an ambient temperature signal is obtained to enable temperature compensation with increased precision.

Other advantages of the present invention will be apparent from the following description.

DESCRIPTION OF THE PREFERRED EMBODIMENT

Figure 1:
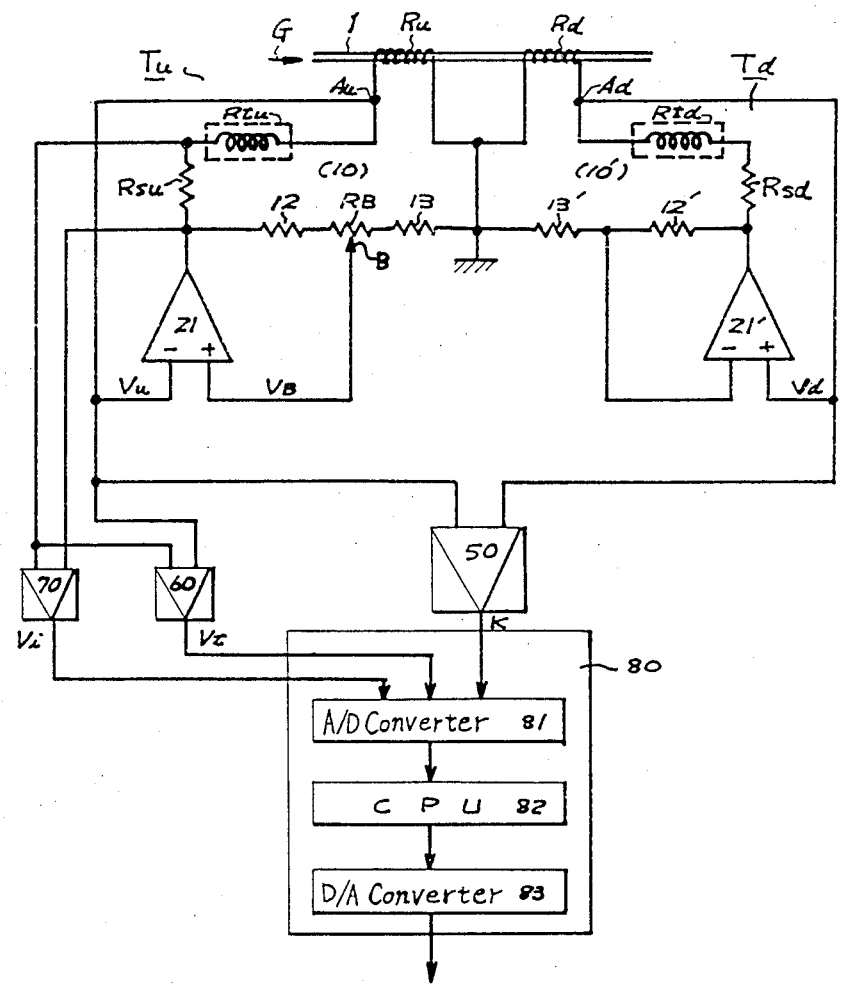
FIG. 1 is a schematic view of an embodiment of the present invention.

An embodiment of the present invention will be described in detail hereinafter with reference to the drawing.

Referring to FIG. 1, a mass flowmeter according to the present invention comprises a conduit 1 through which fluid G flows in the direction of an arrow, and two heat sensitive coils Ru and Rd (hereinafter referred to as an upstream coil Ru and a downstream coil Rd) mounted at two positions of the conduit 1 with a suitable distance therebetween. Each of these coils Ru and Rd comprises a heat sensitive resistive wire such as of an iron and nickel alloy or of platinum having a large temperature coefficient. This is necessary since the fluid G flows through the conduit 1 at a rate of about 5 cc/min. and even a slight change in the flow rate must be detected.

References Tu and Td indicate upstream and downstream constant temperature difference circuits. The upstream circuit Tu includes, in addition to the upstream coil Ru, an ambient temperature detecting resistor Rtu, a temperature difference setting resistor Rsu, a control unit 21 (which is an error amplifier), and bridge resistors 12 and 13. The downstream circuit Td includes, in addition to the downstream coil Rd, an ambient temperature detecting resistor Rtd, a temperature difference setting resistor Rsd, a control unit 21' (which is an error amplifier), and bridge resistors 12' and 13'. The two constant temperature difference circuits Tu and Td are formed of substantially the same components in order that the upstream coil Ru and the downstream coil Rd have approximately the same constant temperature difference from ambient temperature. (In the drawing, the components of the downstream constant temperature difference circuit Td having the same functions as their upstream counterparts are indicated by the same numerals with a prime.) Thus, only the upstream circuit Tu will be described hereinafter. The upstream circuit Tu is formed of a bridge circuit 10 and the control unit 21 (namely an error amplifier). The bridge circuit 10 comprises the upstream coil Ru, the upstream ambient temperature detecting resistor Rtu, the temperature difference setting resistor Rsu, the bridge resistors 12 and 13 and, if necessary, a zero balance resistor RB. The bridge resistors 12 and 13 have a sufficiently small temperature coefficient compared with the upstream coil Ru. The ambient temperature detecting resistors Rtu and Rtd each have a resistance variable with ambient temperature variations, and vary the temperature of heat sensitive coils Ru and Rd to levels determined by the temperature difference setting resistors Rsu and Rsd.

That is, the upstream and downstream heat sensitive coils Ru and Rd have temperature characteristics expressed in the following equation:

$$Ru = Rd = Ro\,(1 + \alpha t) \quad (10)$$

where Ru and Rd are the resistances of coils Ru and Rd respectively, Ro is the resistance of the coils Ru and Rd, and at 0° C., t is a temperature of the coils Ru and Rd, and $\alpha$ is a temperature coefficient of the coils Ru and Rd.

The constant temperature difference circuits Tu and Td are designed to operate to establish the following resistance equations (11) and (12):

$$Ru = Rsu + Rtu \quad (11)$$

$$Rd = Rsd + Rtd \quad (12)$$

where Rsu, Rtu, Rsd and Rtd are the resistances of resistors Rsu, Rtu, Rsd, and Rtd respectively.

The ambient temperature detecting resistors Rtu and Rtd have almost the same characteristics as the upstream and downstream coils Ru and Rd, and the following resistors equation is established where the ambient temperature and the temperature of the temperature detecting resistors Rtu and Rtd are substantially the same:

$$Ro(1 + \alpha t) = Rsu + Ro\,(1 + \alpha T) \quad (13)$$

where T is the ambient temperature, and t is the coil temperature.

Therefore, $$t = (Rsu/\alpha \cdot Ro) + T \quad (14)$$

The equation (14) shows that the coil temperature t constantly maintains the constant temperature difference (Rsu/$\alpha$· Ro) since the ambient temperature T has no coefficient as distinct from the prior art. The temperature difference setting resistor Rsu used herein has a very small temperature coefficient, therefore (Rsu/$\alpha$· Ro) has a constant value at all times regardless of temperatures.

This feature maintains a constant difference between the ambient temperature T and the temperature of heat sensitive coils Ru and Rd.

Reference Au indicates a point of connection between the upstream coil Ru and the upstream ambient temperature detecting resistor Rtu, whereas reference Ad indicates a corresponding point of connection in the downstream constant temperature difference circuit Td. Point B is a point of connection between the two bridge resistors 12 and 13, where a zero balance resistor RB which is a variable resistor is mounted. This resistor RB acts to compensate for a slight dispersion among constituents of the upstream and downstream bridge circuits 10 and 10', thereby to cause an output circuit 50 to provide zero output. The control unit 21 receives potentials Vu and VB of the points of connection Au and B. The control unit 21 compares the potentials Vu and VB and, if there is a difference therebetween, outputs a control signal for controlling the upstream coil Ru to equalize the two potentials Vu and VB. This applies also to the downstream circuit.

The output circuit 50 receives the potential Vu of the point of connection Au in the upstream constant temperature difference circuit Tu and the potential Vd of the point of connection Ad in the downstream constant temperature difference circuit Td, and outputs a difference therebetween. The output signal K of the output circuit 50 indicates a difference between the amounts of energy supplied to the upstream and downstream coils Ru and Rd from a power source (not shown) for equalizing the temperature of the coils Ru and Rd and rendering the difference between the coil temperature and ambient temperature constant. Further, the magnitude of the output signal K is proportional to the mass flow rate of the fluid G through the conduit 1.

When the fluid G is not flowing through the conduit 1, the energy is just supplied from the power source to the upstream coil Ru and downstream coil Rd through the bridge circuit 10 and bridge circuit 10' respectively. At this time the temperature of each coil Ru or Rd is maintained at a sum of ambient temperature T and a temperature difference set by the temperature difference setting resistor Rsu or Rsd. The temperature differences of the two coils Ru and Rd with respect to the ambient temperature T are approximately the same since the ambient temperature detecting resistors Rtu and Rtd in the upstream and downstream constant temperature difference circuits Tu and Td have the same characteristics. Consequently, the potential Vu at the point Au and the potential Vd at the point Ad are approximately the same, whereby the output signal K of the output circuit 50 is zero which indicates that the fluid G is not flowing. Since there is a dispersion among the constituents as noted above, the ratio of the zero balance resistor RB is changed to strike the zero balance.

When the fluid G is flowing through the conduit 1, the fluid G takes up heat form the upstream coil Ru and flows as thereby heated to the downstream position. The downstream coil Rd loses a less amount of heat to the fluid G than the upstream coil Ru since there is a smaller temperature difference between the downstream coil Rd and the fluid G. Then a greater amount of energy is supplied from the power source to the upstream coil Ru to compensate for the heat loss and to maintain the temperature difference between the upstream coil Ru and the ambient temperature at a constant difference of about 10° C., for example, thereby increasing the potential at the point Au.

The downstream coil Rd also is maintained at the constant temperature difference with respect to the ambient temperature. However, a less amount of energy may be supplied to the downstream coil Rd from the power source than is supplied to the upstream coil Ru since a less amount of heat is lost to the fluid G (which is less by the amount of heat loss of the upstream coil Ru). As a result, the potential at the point Ad is reduced, thereby to produce a difference between the voltages Vu and Vd input to the output circuit 50. Then the output signal K corresponds to Vu minus Vd. The Vu minus Vd is proportional to the mass flow rate of the fluid G through the conduit 1, and therefore output signal K is representative of the mass flow rate of fluid G.

Number 60 in FIG. 1 indicates an ambient temperature detecting amplifier for detecting and amplifying voltage Vt of the ambient temperature detecting resistor Rtu. Number 70 indicates a temperature difference setting amplifier for detecting and amplifying voltage Vi of the temperature difference setting resistor Rsu. The voltage Vi is the product of bridge current i flowing through the temperature difference setting resistor Rsu as multiplied by its resistance.

The ambient temperature detecting amplifier 60 and temperature difference setting amplifier 70 are provided in either the upstream circuit or the downstream circuit.

The ambient temperature detecting resistor voltage Vt and temperature setting resistor voltage Vi detected and amplified by the amplifiers 60 and 70, respectively, are fed to the compensation circuit 80 for an operation $Vt/Vi = Rtu/Rsu$. Since the resistance value of Rsu is constant regardless of the ambient temperature, the ambient temperature is derived from the resistance value of Rtu which is variable therewith. A resulting ambient temperature signal enables a temperature compensating operation to be performed with increased accuracy.

In this embodiment, the compensation circuit 80 includes an A/D conversion circuit 81, a CPU 82 and a D/A conversion circuit 83. However, the construction is not limited to this embodiment but may employ a logic circuit mode or an analog mode for signal processing.

Figure 2:
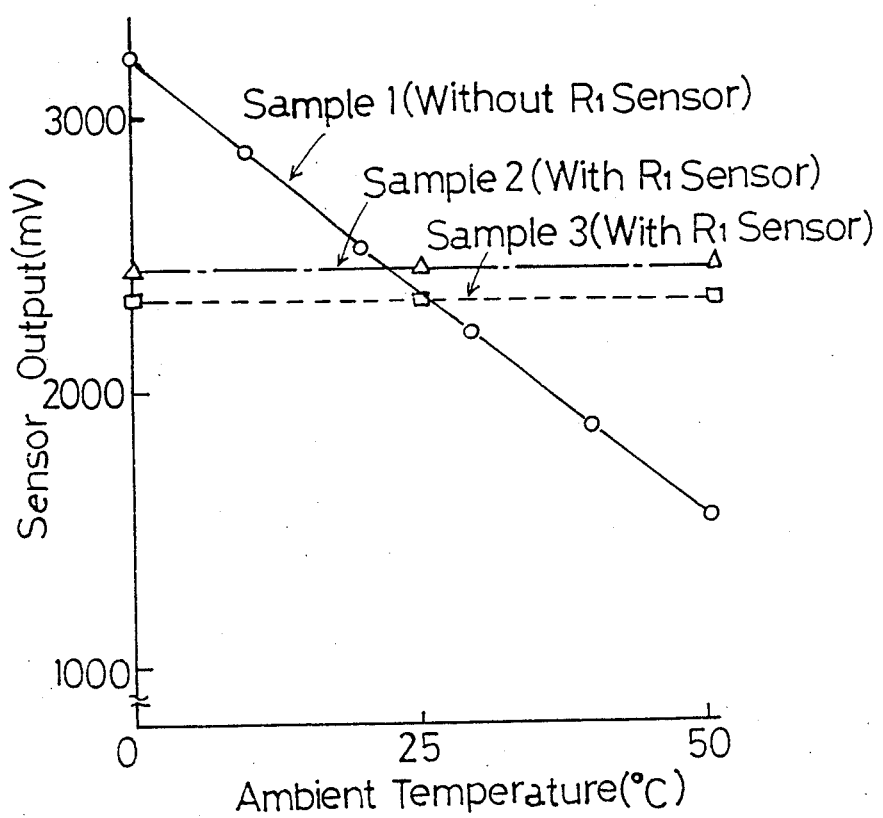
FIG. 2 is a graph for comparing the present invention and the prior art.
Figure 3:
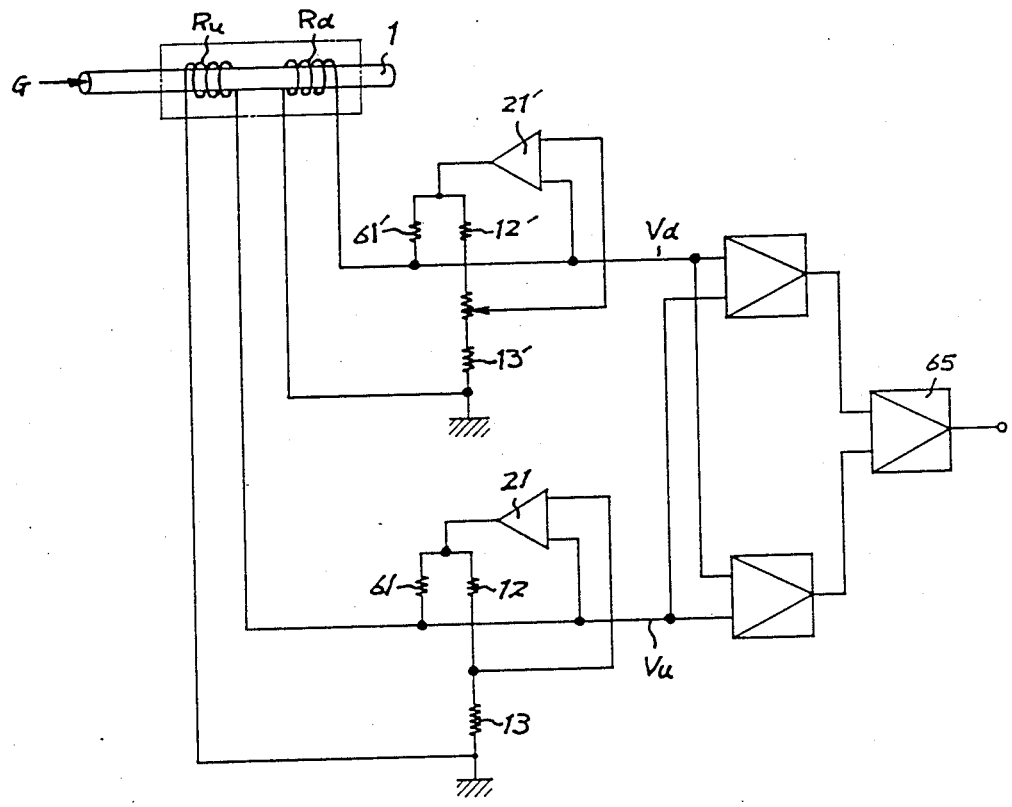
FIG. 3 is a schematic view of a known construction.
Figure 4:
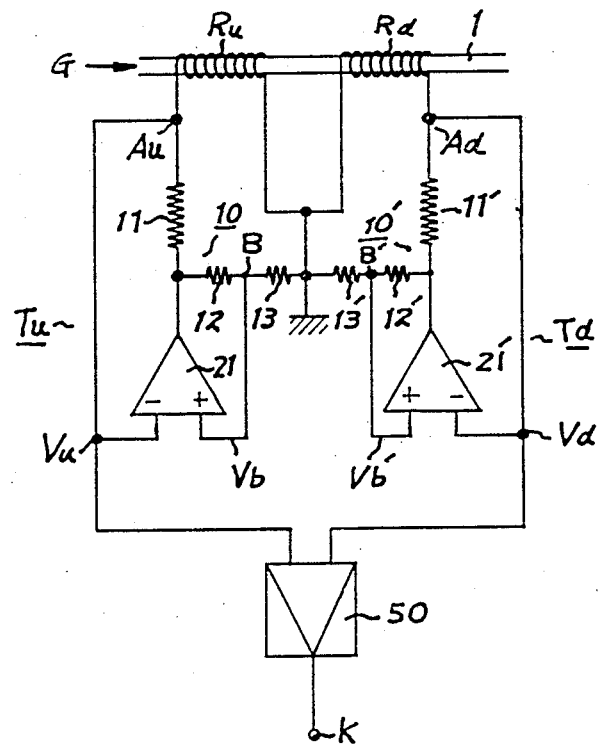
FIG. 4 is a schematic view of another known construction.

FIG. 2 shows the effect of ambient temperature compensation for the flowmeter according to the present invention. In FIG. 2, the horizontal axis represents ambient temperatures, and the vertical axis represents sensor output voltages (with the output adjusted to 2500 mV corresponding to a flow rate of 5 ml/min. through the conduit).

In FIG. 2, for the purpose of comparison with the prior art, the ambient temperature sensitive resistors Rtu and Rtd of the present invention are replaced by resistors having a small temperature coefficient for resistance and the resulting graph of output voltage versus ambient temperature is plotted in the line —o— (Sample 1).

The graph for sample 1 in FIG. 2 shows an output voltage variation of 1.3% of Full Scale occurring per 1° C. change of ambient temperature. It will be appreciated that, in the case of the sensor or flowmeter according to this invention using ambient temperature sensitive resistors Rtu and Rtd, of output voltage is almost flat and the influences of the ambient temperature are only negligible as shown by the two substantially horizontal lines in FIG. 2 (Sample 2 and Sample 3).

What is claimed is:

1. A mass flowmeter comprising;
   a pair of heat sensitive coils mounted at an upstream position and a downstream position of a conduit through which a fluid flows, said heat sensitive coils having resistance variable with temperature of said fluid,
   an ambient temperature detecting resistor having approximately the same characteristics as and connected in series to each of said heat sensitive coils,
   a temperature difference setting resistor having approximately zero temperature coefficient and connected in series to said ambient temperature detecting resistor,
   each of said heat sensitive coils, said ambient temperature detecting resistor and said temperature difference setting resistor being included in one of separate, upstream and downstream constant temperature difference circuits, and
   control means for controlling differences between temperatures of said heat sensitive coils and ambient temperature received from said constant temperature difference circuits to be approximately the same as a value set by said temperature difference setting resistor,
   a mass flow rate of the fluid through said conduit being measured by detecting a difference in amounts of energy supplied to said heat sensitive coils.

2. A mass flowmeter as claimed in claim 1, further comprising a temperature compensation circuit for deriving the ambient temperature from an operation of a resistance which is a division of a quotient of a terminal voltage of said ambient temperature detecting resistor divided by an ampere of current flowing therethrough.

3. A mass flowmeter for measuring the mass of fluid flowing through a conduit having a first heat sensitive element mounted at an upstream position of the conduit and a second heat sensitive element mounted at a downstream position of the conduit, said first heat sensitive element included in a first constant temperature difference circuit and said second heat sensitive element included in a second constant temperature difference circuit, each of said constant difference circuits including the following components connected in series:
   one of said heat sensitive elements,
   an ambient temperature detecting resistor having approximately the same characteristics as the one said heat sensitive element, and
   a temperature difference setting resistor having approximately
   a zero temperature coefficient; control means for each of said constant temperature difference circuits controlling the difference in temperature between the temperature of the heat sensitive element of that circuit and the ambient temperature so that said constant temperature difference circuit maintains a temperature difference approximately the same as the value set by said temperature difference setting resistor of that said constant temperature difference circuit.

* * * * *